Figure 1:
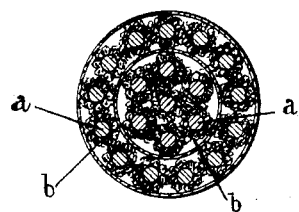

(No Model.)

W. R. PATTERSON.
INSULATED ELECTRICAL CONDUCTOR.

No. 273,593. Patented Mar. 6, 1883.

Witnesses,
Henry Frankfurter,
T. S. Baker.

Inventor.
William R. Patterson
By George P. Barton
atty.

UNITED STATES PATENT OFFICE.

WILLIAM R. PATTERSON, OF CHICAGO, ILL., ASSIGNOR, BY MESNE ASSIGNMENTS, TO THE WESTERN ELECTRIC COMPANY, OF SAME PLACE.

INSULATED ELECTRICAL CONDUCTOR.

SPECIFICATION forming part of Letters Patent No. 273,593, dated March 6, 1883.

Application filed June 8, 1882. (No model.)

*To all whom it may concern:*

Be it known that I, WILLIAM R. PATTERSON, a citizen of the United States, residing at Chicago, in the county of Cook and State of Illinois, have invented a certain new and useful Improvement in Insulated Electrical Conductors, of which the following is a full, clear, concise, and exact description, reference being had to the accompanying drawings, forming a part of this specification.

My invention consists in combining in the fibrous covering of telegraph wires and cables two materials of different hygroscopic qualities, so that the insulation of the finished wire or cable will not be impaired by necessary or accidental exposure to moisture in the process of manufacture. I find that the insulation of wires wound with cotton is very easily impaired by exposure to the air on account of the hygroscopic nature of the material. Jute is much less hygroscopic, and is therefore preferable as a covering for the wires; but in the process of manufacture the wires must be handled more or less, and necessarily are exposed to injury from drops of water, perspiration, damp hands, and carelessness and ignorance of workmen. A drop of water falling on a cotton-covered wire is dissipated through a much greater mass than if falling on a jute-covered wire, thus lessening the escape of current from the wire at that one point, and the consequent electrolytic action. For this reason cotton is the better material to use. It is well known that if two substances of different hygroscopic qualities are exposed together moisture is absorbed by the more hygroscopic substance until it has reached such a point of saturation that the affinities of both substances for water are equalized. Therefore I wind the wires with one or more layers of jute yarn, according to the thickness of insulation desired, and outside of this wind or braid a covering of cotton yarn. In a cable of more than one conductor the different wires are wound separately with jute and then formed into a cable, which I cover with a serving of cotton yarn. The conductors thus covered are then thoroughly dried before they are drawn into the pipe. Moisture absorbed from the air, or otherwise brought into contact with the cable, is held by the outer cotton serving and not distributed among the conductors of the cable. I find practically that two or three times as high insulation can be obtained by using jute and cotton in combination, as above described, instead of using either substance separately or cotton next to the wires and a serving of jute exterior to the cotton, as heretofore.

In the drawings, Figure 1 is a transverse section of a core consisting of twenty conductors. Each conductor $a$ is first covered with the jute $b$. The outer serving, $c$, must be of cotton, sufficiently thick to completely cover the core. I find that a serving at least one-twentieth of an inch in thickness is required under ordinary circumstances.

Figure 2:

In Fig. 2 I have shown a single wire, $m$, covered with an inner winding, $n$, of jute and an outer winding, $o$, of cotton.

I have tested a cable a mile in length, in which a core of thirteen conductors insulated with jute and served with cotton, as above described, were protected by the usual lead pipe and filling of paraffine charged with gas, and found the insulation of each conductor at least two thousand megohms to the mile, which is from two to three times as high insulation as I have been able to obtain in cables in which cotton or jute is used separately.

I claim—

1. The combination of a telegraph-wire with jute wound directly upon the wire and an exterior serving of cotton, substantially as and for the purpose specified.

2. The combination, in a telegraph-cable, of a core of conductors, each insulated separately with jute, and an exterior serving of cotton wound about the core.

WILLIAM R. PATTERSON.

Witnesses:
GEORGE R. BARTON,
F. S. BAKER.